Patented Nov. 11, 1952

2,617,747

UNITED STATES PATENT OFFICE 2,617,747

MOTHPROOFING

Ida Marie Rasmussen, New Brunswick, and Edward F. Rogers, Middletown, N. J., assignors to Merck & Co., Inc., Rahway, N. J., a corporation of New Jersey No Drawing. Application June 28, 1950,
Serial No. 170,946

3 Claims. (Cl. 117—138.5)

This invention relates to an improved process for preparing N,N'-methylene bis(α-chloro)acetamide, and compositions containing this compound which are suitable for the protection of materials susceptible to attack by textile pests.

The preparation of N,N'-methylene bis(α-chloro)acetamide was described by Einhorn (Annalen, 343, 284 (1905)) by a two-step process comprising the reaction of formaldehyde with chloracetamide in aqueous potassium carbonate solution, and the subsequent dehydration of the resulting intermediate, N-methylol chloracetamide, with concentrated sulfuric acid to produce the desired compound. These reactions may be illustrated by the following equations:

ClCH$_2$CONH$_2$ + HCHO ⟶ ClCH$_2$CONHCH$_2$OH
N-methylol Chloracetamide

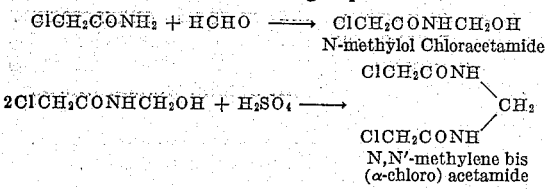

N,N'-methylene bis
(α-chloro) acetamide

However, this method is unsatisfactory for the large scale production of N,N'-methylene bis(α-chloro)acetamide since the yield of product obtained by the overall process is less than about 8%.

This invention is concerned with an improved procedure for preparing N,N'-methylene bis(α-chloro)acetamide and the application of this compound as an insecticide. It is an object of the present invention to provide an economical method suitable for the production of N,N'-methylene bis(α-chloro)acetamide on a large scale. A further object is to provide new compositions containing N,N'-methylene bis(α-chloro)acetamide which are suitable for protection of materials susceptible to attack by textile pests. Other objects of the invention will be apparent from the detailed description hereinafter provide.

In accordance with one embodiment of our invention, we have found that N,N'-methylene bis(α-chloro)acetamide is readily prepared by reacting chloracetamide for a dialkyl acetal of formaldehyde in the presence of a mineral acid. This reaction may be represented by the following equation:

2ClCH$_2$CONH$_2$ + CH$_2$(OR)$_2$ →

(ClCH$_2$CONH)$_2$CH$_2$ + ROH

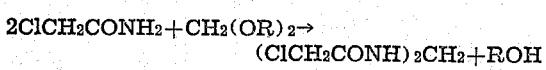

wherein R represents an alkyl group. The reaction is effected by intimately contacting the mineral acid with a mixture of the reactants. After completion of the reaction, the product is recovered by adding the reaction mixture to an aqueous solution containing an alkali such as sodium or potassium hydroxide. The desired product, N,N'-methylene bis(α-chloro)acetamide, precipitates from the resulting alkaline aqueous solution and is conveniently recovered as for example, by filtration. The product is obtained in a yield in excess of about 60% of theory by our improved process. We have found that it is especially advantageous to use a di-lower alkyl acetal of formaldehyde such as the dimethyl or diethyl acetal in this reaction since these acetals are most readily prepared. Although the various mineral acids are suitable for use in the condensation of chloracetamide with a dialkyl acetal of formaldehyde, we prefer to use sulfuric acid in effecting this reduction since under favorable conditions an optimum yield of product is obtained.

In accordance with a further embodiment of our invention, we have found that N,N'-methylene bis(α-chlor)acetamide either alone or in combination with other insecticidal active substances, and a suitable carrier therefor may be applied to materials subject to attack by textile pests such as the clothes moth or black carpet beetle, by spraying, dusting, pouring, dipping, etc., in the form of solutions, suspensions, powders, and the like containing the active principle in optimum concentrations for the particular purpose at hand.

Thus, N,N'-methylene bis(α-chloro)acetamide can be dissolved in a suitable solvent or mixture of solvents at optimum concentrations with respect to the intended purpose for which it is to be used and applied to the material to be protected. Suitable solvents include alcohols, esters, petroleum fractions, ketones and the like.

Further, it can be suspended in suitable vehicles or combination of vehicles in accordance with the accepted practice in the art. For example, it can be suspended in aqueous mediums which, in addition, may contain various wetting or spreading agents and/or other insecticidal compounds.

This active compound can also be used in the form of a dusting powder wherein the compounds are mixed with, or adsorbed on finely divided carriers such as volcanic ash, kieselguhr, carbon, bentonite, fuller's earth, nut shell flours, talc and the like.

In general, the active agent of our invention may be formulated in a wide variety of carriers containing various adjuvants as may be best suited for the control of a particular pest, depending upon the habits and nature of the pests which are to be controlled. Thus compositions are prepared with the active agent in a suitable state of composition, subdivision and association which will be most effective for the particular purpose at hand.

N,N'-methylene bis(α-chloro)acetamide is an agent which is particularly effective in protecting organic materials such as woolens, furs, feathers, and the like against textile pests such as the webbing clothes moth or the black carpet beetle. We have found that the application of a small quantity of N,N'-methylene bis(α-chloro)acetamide to such materials affords good protection from the ravages of these insects. While, as indicated previously, the optimum amount of N,N'-methylene bis(α-chloro)acetamide used will depend upon the material and the insect from which it is to be protected, in general we find that amounts of less than 1% are sufficient to afford satisfactory protection. Even with concentrations of the active ingredient as low as ¼%, good protection against insect attack is observed. The active principle is mose conveniently applied to fabrics and the like in the form of a solution in an organic solvent such as acetone, alcohol, chlorinated solvents, benzene and the like.

The following examples are presented to illustrate specific embodiments of our invention.

EXAMPLE 1

About 9.3 g. chloracetamide is mixed with 6.1 g. methylal (formaldehyde dimethylacetal), and 7 ml. concentrated sulfuric acid is added dropwise to the mixture under shaking until solution is complete. The reaction mixture is allowed to stand at room temperature for one hour, and is then poured into a mixture of 10 g. NaOH in 15 ml. water and 30 g. ice. The product, N,N'-methylene bis(α-chloro)acetamide, precipitates and is filtered off, washed with water and dried. Yield: 6.0 g. (61% of theory). Melting point: 165° C.

If desired, N,N'-methylene bis (α-chloro)-acetamide can also be conveniently obtained by using formaldehyde diethyl acetal in place of the dimethyl acetal shown in the above example.

EXAMPLE 2

*Insecticide tests*

The compound was tested for protection of wool against textile pests by the method of R. E. Heal (J. Econ. Entomology, 35 (2) 249–52 (1942)), which may be summarized as follows:

Woolen fabric is impregnated with an acetone solution of the compound to be tested to give known concentrations on the fabric. After evaporation of the solvent, 10 larvae of the webbing clothes moth (*Tineola bisselliella* Hum.) or of the black carpet beetle (*Attagenus peceus* Oliv.) are confined on weighed patches of the treated fabric for two weeks. After removal of the larvae the patches are again weighed. The loss of weight of the fabric is indicated as "damage." Weight loss greater than 10 mgm. is considered to be inadequate protection.

The following results were obtained by this method:

| Compound | Concentration on wool in percent | Mg. damage by webbing clothes moth | Mg. damage by black carpet beetle |
|---|---|---|---|
| N,N'-methylene-bis (α-chloro) acetamide | 1.0 | 2.7 | 4.5 |
|  | 0.25 | 6.8 | 5.9 |
| Chloracetamide | 1.0 | 20.4 | 16.3 |
|  | 0.5 | 30.0 | 20.1 |
| Control (wool) | | 45.3 | 27.8 |

From the above tabulated results, it will be noted that whereas the N,N'-methylene bis-(α-chloro)acetamide afforded adequate protection against damage by both the webbing clothes moth and the black carpet beetle, while chloracetamide alone was ineffective in protecting the wool from insecticidal damage.

Various changes and modifications may be made in our invention, certain preferred embodiments of which are herein described, without departing from the scope thereof. It is our intention that such changes and modifications, to the extent that they are within the scope of the appended claims, will be construed as part of our invention.

We claim:

1. A process for mothproofing woolen fabrics that comprises treating said woolen fabric with a solution of N,N'-methylene bis(α-chloro)-acetamide in an organic solvent and depositing on said fabric an amount of N,N'-methylene bis(α-chloro)acetamide equivalent to about ¼ to 1% by weight of said fabric.

2. A process for mothproofing woolen fabrics that comprises treating said woolen fabric with a solution of N,N'-methylene bis(α-chloro)-acetamide in acetone and depositing on said fabric an amount of N,N'-methylene bis(α-chloro)acetamide equivalent to about ¼ to 1% by weight of said fabric.

3. A mothproofed woolen fabric characterized as having deposited thereon N,N'-methylene bis-(α-chloro)acetamide in an amount equivalent to about ¼ to 1% by weight of said woolen fabric.

IDA MARIE RASMUSSEN.
EDWARD F. ROGERS.

REFERENCES CITED

The following references are of record in the file of this patent:

UNITED STATES PATENTS

| Number | Name | Date |
|---|---|---|
| 2,338,177 | Graenacher et al. | Jan. 4, 1944 |
| 2,365,813 | Gluesenkamp | Dec. 26, 1944 |
| 2,475,846 | Lundberg | July 12, 1949 |

FOREIGN PATENTS

| Number | Country | Date |
|---|---|---|
| 164,611 | Germany | Nov. 10, 1905 |

OTHER REFERENCES

Siegler et al., J. Econ. Ent., volume 35 (1942), pages 781–4.

Fleming, J. Econ. Ent., volume 21 (1928), pages 813 to 818.

Einhorn-Annalen, volume 343, page 284 (1905).